US008372369B2

(12) United States Patent
Yang et al.

(10) Patent No.: US 8,372,369 B2
(45) Date of Patent: Feb. 12, 2013

(54) ENHANCING HYDROGEN SPILLOVER AND STORAGE

(75) Inventors: Ralph T. Yang, Ann Arbor, MI (US); Yingwei Li, Ann Arbor, MI (US); Anthony J. Lachawiec, Jr., Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 13/090,618

(22) Filed: Apr. 20, 2011

(65) Prior Publication Data

US 2011/0201492 A1 Aug. 18, 2011

Related U.S. Application Data

(60) Division of application No. 11/820,954, filed on Jun. 21, 2007, now Pat. No. 7,951,749, which is a continuation-in-part of application No. 11/442,898, filed on May 30, 2006.

(60) Provisional application No. 60/725,337, filed on Oct. 11, 2005, provisional application No. 60/751,744, filed on Dec. 19, 2005.

(51) Int. Cl.
*C23C 22/00* (2006.01)

(52) U.S. Cl. ............. 423/335; 423/447.8; 423/460; 568/5; 427/217; 502/64

(58) Field of Classification Search ....... 568/5; 427/217; 502/64; 423/335, 447.8, 460
See application file for complete search history.

(56) References Cited

U.S. PATENT DOCUMENTS

| | | | |
|---|---|---|---|
| 4,029,567 A | 6/1977 | Fernand et al. | |
| 4,912,072 A * | 3/1990 | Mallouk et al. | 502/74 |
| 4,954,469 A | 9/1990 | Robinson | |
| 5,102,745 A | 4/1992 | Tatarchuk et al. | |
| 5,314,857 A | 5/1994 | Koontz | |
| 5,342,528 A | 8/1994 | Adachi et al. | |
| 5,965,479 A | 10/1999 | Suzuki | |
| 6,297,185 B1 | 10/2001 | Thompson et al. | |
| 6,559,094 B1 | 5/2003 | Korotkikh et al. | |
| 6,596,055 B2 | 7/2003 | Cooper et al. | |
| 6,596,243 B1 | 7/2003 | Fujii et al. | |
| 6,930,193 B2 | 8/2005 | Yaghi et al. | |
| 8,043,596 B2 * | 10/2011 | Soga et al. | 423/447.1 |

OTHER PUBLICATIONS

Dillon, et al., "Storage of Hydrogen in Single-Walled Carbon Nanotubes", Nature, vol. 386, Mar. 27, 1997, pp. 377-379.
Ye, et al., "Hydrogen Adsorption and Cohesive Energy of Single-Walled Carbon Nanotubes", Applied Physics Letters, vol. 74, No. 16, Apr. 19, 1999, pp. 2307-2309.
Wang et al., "Computer Simulations of Hydrogen Adsorption on Graphite Nanofibers", Journal of Physical Chemistry B, vol. 103, No. 2, Jan. 14, 1999, pp. 277-281.
Liu, et al., "Hydrogen Storage in Single-Walled Carbon Nanotubes at Room Temperature", Science, vol. 286, Nov. 5, 1999, pp. 1127-1129.
Chen, et al., "High H2 Uptake by Alkali-Doped Carbon Nanotubes Under Ambient Pressure and Moderate Temperatures", Science, vol. 285, Jul. 2, 1999, pp. 91-93.
Yang, Ralph T., "Hydrogen Storage by Alkali-Doped Carbon Nanotubes—Revisited", Carbon, 38 (2000), pp. 623-626.
Dillon, et al., "Hydrogen Storage Using Carbon Adsorbents: Past, Present and Future", Appl. Phys. A 72 (2001), pp. 133-142.
Tibbetts, et al., "Hydrogen Storage Capacity of Carbon Nanotubes, Filaments, and Vapor-Grown Fibers", Carbon 39 (2001), pp. 2291-2301.
Cheng, et al., "Mechanism of Hydrogen Sorption in Single-Walled Carbon Nanotubes", J. Am. Chem. Soc. 2001, 123, pp. 5845-5846.
Simonyan, et al., "Hydrogen Storage in Carbon Nanotubes and Graphitic Nanofibers", Journal of Alloys and Compounds, 330-332 (2002), pp. 659-665.
Lueking et al., "Hydrogen Spillover From a Metal Oxide Catalyst onto Carbon Nanotubes—Implications for Hydrogen Storage", Journal of Catalysis 206 (2002), pp. 165-168.
Chambers et al., "Hydrogen Storage in Graphite Nanofibers", The Journal of Physical Chemistry B, vol. 102, No. 22, May 28, 1998, pp. 4253-4256.
Ahn et al., "Hydrogen Desorption and Adsorption Measurements on Graphite Nanofibers", Applied Physics Letters, vol. 73, No. 23, Dec. 7, 1998, pp. 3378-3380.
Park et al., "Further Studies of the Interaction of Hydrogen With Graphite Nanofibers", J. Phys. Chem. B, 1999, 103, pp. 10572-10581.
Gupta et al., "Further Studies on Microstructural Characterization and Hydrogenation on Behaviour of Graphite Nanofibers", Intl. J. of Hydrogen Energy 26 (2001), pp. 857-862.
Browning et al., "Studies into the Storage of Hydrogen in Carbon Nanofibers:Proposal of a Possible Reaction Mechanism", Nano Letters 2002, vol. 2, No. 3, pp. 201-205.
Lueking et al., "Hydrogen Storage in Graphite Nanofibers: Effect of Synthesis Catalyst and Pretreatment Conditions", Langmuir 2004, 20, pp. 714-721.
Chahine et al., "Low-Pressure Adsorption Storage of Hydrogen", Intl. J. Hydrogen Energy, vol. 19, No. 2 (1994), pp. 161-164.
Lamari et al., "Thermal Effects in Dynamic Storage of Hydrogen by Adsorption", Environmental and Energy Engineering, vol. 46, No. 3, Mar. 2000, pp. 632-646.
Orimo et al., "Hydrogen in the Mechanically Prepared Nanostructured Graphite", Applied Physics Letters, vol. 75, No. 20, Nov. 15, 1999, pp. 3093-3095.
Yang et al., "Ab Initio Molecular Orbital Study of Adsorption of Atomic Hydrogen on Graphite: Insight into Hydrogen Storage in Carbon Nanutubes", Carbon 40 (2002), pp. 437-444.
Khoobiar, S.,"Particle to Particle Migration of Hydrogen Atoms on Platinum-Alumina Catalysts From Particle to Neighboring Particles",Notes,vol. 68,No. 2, Feb. 1964, pp. 411-412.
Sinfelt et al., "Kinetic Evidence for the Migration of Reactive Intermediates in Surface Catalysis",Migration of Intermediates in Surface Catalysis,Nov. 5, 1963, pp. 3365-3367.

(Continued)

*Primary Examiner* — Stuart Hendrickson
(74) *Attorney, Agent, or Firm* — Dierker & Associates, P.C.

(57) ABSTRACT

Methods for enhancing hydrogen spillover and storage are disclosed. One embodiment of the method includes doping a hydrogen receptor with metal particles, and exposing the hydrogen receptor to ultrasonication as doping occurs. Another embodiment of the method includes doping a hydrogen receptor with metal particles, and exposing the doped hydrogen receptor to a plasma treatment.

14 Claims, 4 Drawing Sheets

OTHER PUBLICATIONS

Connor, Jr. et al., "Spillover in Heterogeneous Catalysis", Chem. Rev. 1995, 95, pp. 759-788.

Srinivas et al.,"Direct Observation of Hydrogen Spillover on Carbon-Supported Platinum and Its Influence on the Hydrogenation of Benzene",J. of Catalysis 148,(1994),pp. 470-477.

Lueking et al., "Hydrogen Spillover to Enhance Hydrogen Storage-Study of the Effect of Carbon Physicochemical Properties", Appl. Catalysis A: General 265 (2004), pp. 259-268.

Boudart, et al., "On the Slow Uptake of Hydrogen by Platinized Carbon", Journal of Catalysis 18 (1970), pp. 46-51.

Levy et al., "The Kinetics and Mechanism of Spillover", Journal of Catalysis 32 (1974), pp. 304-314.

Cassell, et al., "Large Scale CVD Synthesis of Single-Walled Carbon Nanotubes", J. Phys. Chem. B 1999, 103, pp. 6484-6492.

Goodell, P.D., "Stability of Rechargeable Hydriding Alloys During Extended Cycling", Journal of the Less-Common Metals, 99 (1984), pp. 1-14.

Zhou, et al., "Linearization of Adsorption Isotherms for High-Pressure Applications", Chemical Engineering Science, vol. 53, No. 14 (1998), pp. 2531-2536.

Benson et al., "Hydrogen-Oxygen Titration Method for the Measurement of Supported Platinum Surface Areas", Journal of Catalysis 4 (1965), pp. 704-710.

Li, et al., "Hydrogen Storage in Metal-Organic Frameworks by Bridged Hydrogen Spillover", J. Am. Chem. Soc., Published on Web Jun. 2, 2006.

Yang et al., "Adsorption of Spillover Hydrogen Atoms on Single-Wall Carbon Nanotubes", J. Phys. Chem. B, Published on Web Mar. 2, 2006 , 110, pp. 6236-6244.

Cote, Adrien P. et al., "Porous, Crystalline, Covalent Organic Frameworks," Science, vol. 310, Nov. 18, 2005, pp. 1166-1170.

International Preliminary Report on Patentability for S.N. PCT/US2006/021509 dated Apr. 24, 2008 (5 pages).

International Search Report for S.N. PCT/US2006/021509 dated Oct. 5, 2007 (3 pages).

* cited by examiner

ENHANCING HYDROGEN SPILLOVER AND STORAGE

CROSS REFERENCE TO RELATED APPLICATIONS

This application is a divisional of U.S. patent application Ser. No. 11/820,954, filed Jun. 21, 2007, now U.S. Pat. No. 7,951,749 which claims the benefit of U.S. Provisional Patent Application Ser. No. 60/725,337 filed on Oct. 11, 2005, and U.S. Provisional Patent Application Ser. No. 60/751,744 filed on Dec. 19, 2005, and additionally is a continuation-in-part of copending U.S. patent application Ser. No. 11/442,898 filed on May 30, 2006, each of which is incorporated herein by reference in its entirety.

STATEMENT REGARDING FEDERALLY SPONSORED RESEARCH OR DEVELOPMENT

This invention was made with government support under Grant No. DE-FC36-05-G015078 awarded by the U.S. Department of Energy. The government has certain rights in the invention.

BACKGROUND

The present disclosure relates generally to hydrogen storage, and more particularly to methods for enhancing hydrogen spillover and storage.

The U.S. Department of Energy (DOE) has established a multi-stage target for hydrogen storage capacity in materials, for example, those materials intended for fuel cell applications. The targets for on-board hydrogen storage materials are about 1.5 kW/kg (4.5 wt %) by 2007, about 2 kW/kg (6 wt %) by 2010, and about 3 kW/kg (9 wt %) by 2015.

In attempts to meet the DOE targets, nanostructured carbon materials (e.g. carbon nanotubes, graphite nanofibers, activated carbon, and graphite) have become of interest to researchers as potential hydrogen adsorbents. However, it has been shown that nanostructured carbons (in particular, carbon nanotubes) have slow uptake, irreversibly adsorbed species, and the presence of reduced transition metals.

Experimental evidence, combined with ab initio molecular orbital calculations of hydrogen atoms on graphite, has led to the proposal of a mechanism for hydrogen storage in carbon nanostructures involving hydrogen dissociation on metal particles followed by atomic hydrogen spillover and adsorption on the nanostructured carbon surface. Hydrogen spillover was first postulated in the early 1960s, and despite continued investigations and research to support the theory, the mechanistic details of hydrogen spillover are still poorly understood.

As such, it would be desirable to provide methods for enhancing hydrogen spillover and increasing hydrogen storage capacity.

SUMMARY

Methods for enhancing hydrogen spillover and storage are disclosed. One embodiment of the method includes doping a hydrogen receptor with metal particles, and exposing the hydrogen receptor to ultrasonication as doping occurs. Another embodiment of the method includes doping a hydrogen receptor with metal particles, and exposing the doped hydrogen receptor to a plasma treatment.

BRIEF DESCRIPTION OF THE DRAWINGS

Features and advantages of the present disclosure will become apparent by reference to the following detailed description and drawings, in which like reference numerals correspond to similar, though not necessarily identical components. For the sake of brevity, reference numerals or features having a previously described function may not necessarily be described in connection with other drawings in which they appear.

DETAILED DESCRIPTION

Embodiments of the method and composition disclosed herein advantageously increase hydrogen spillover and hydrogen storage capacity in hydrogen receptors (e.g., nanostructured carbon materials). It is believed that the hydrogen storage capacities may advantageously be enhanced by a factor of two or more, when compared to pure samples. Without being bound to any theory, it is believed that ultrasonication and/or plasma treatments serve to substantially improve contact or anchoring between a spillover source and a receptor.

Figure 1:
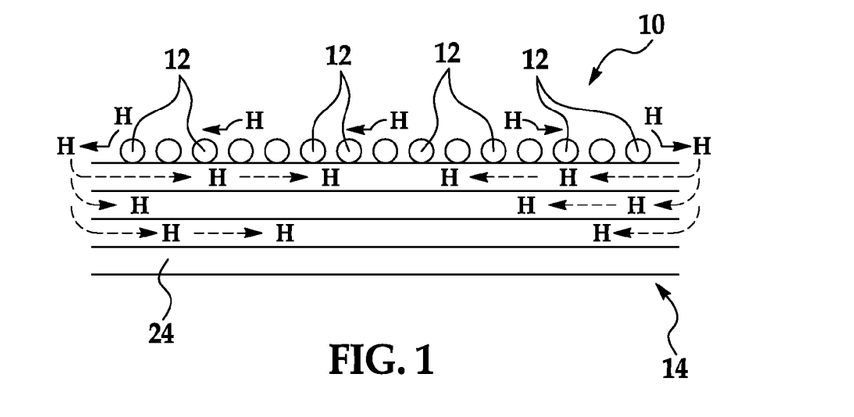
FIG. 1 is a schematic diagram depicting the spillover process in an embodiment of the composition.

Referring now to FIG. 1, an embodiment of the composition 10 is illustrated. The composition includes metal particles 12 and a receptor 14. It is to be understood that the metal particles 12 may serve as the source of hydrogen atoms via dissociation. In this case, the transport of hydrogen atoms from the metal particles 12 to the receptor 14 is referred to as primary spillover.

An embodiment of the method for forming the composition 10 shown in FIG. 1 (and thereby enhancing hydrogen storage of the composition 10) includes doping the receptor 14 with metal particles 12, and exposing the receptor 14 to ultrasonication as doping occurs. In an embodiment, the amount of metal particles 12 doped on and/or in the receptor 14 is less than about 10 wt %. In a non-limiting example, the amount of doped metal particles 12 ranges from about 0.1 wt % to about 6 wt %.

An embodiment of the method includes drying the receptor 14, in part to remove moisture that may be adsorbed, for example, from the ambient air. Drying may be accomplished via degassing and/or heating. In an embodiment, the receptor 14 may be any suitable porous and/or microporous material, including activated carbons, super-activated carbon, carbon nanotubes (a non-limitative example of which includes single-wall carbon nanotubes (SWNT)), carbon nanofibers, molecular sieves, silica gel, alumina, zeolites, metal-organic framework (MOF) materials, covalent organic framework (COF) materials; and combinations thereof. A non-limitative embodiment of super-activated carbon includes AX-21 super-activated carbon, which is commercially available from, for example, Osaka Gas Chemicals, Ltd., Osaka, Japan. In a non-limitative embodiment, the zeolites are selected from zeolite X, zeolite Y, zeolite LSX, MCM-41 zeolites, silicoaluminophosphates (SAPOs), and combinations thereof.

Non-limitative examples of metal-organic frameworks include MOF-5, MOF-8 (the terms "MOF-8" and "IRMOF-8" (iso-reticular MOF-8) are used interchangeably herein), IRMOF-177, MIL-101 (a high surface area metal-organic framework), and/or the like, and/or combinations thereof, which are constructed by linking tetrahedral clusters with linear carboxylates. It is to be understood that porous, crystalline, covalent organic framework (COF) materials may also be used as the receptor 14. COFs are formed from light elements (e.g., H, B, C, N, and O) that form strong covalent bonds in materials such as diamond, graphite, and boron nitride. COFs may be micro- and mesoporous crystalline structures. These COF materials have substantially rigid structures, excellent thermal stabilities (to temperatures up to about 600° C.), and relatively low densities. Further, these materials exhibit permanent porosity with specific surface areas substantially surpassing those of well-known zeolites and porous silicates. Yet further, it has been found that COF materials generally do not adsorb water vapor, and thus may be more stable than MOF materials when used as the receptor 14 in embodiment(s) of the present disclosure. In a non-limiting embodiment, the COF materials are selected from COF-1 $[(C_3H_2BO)_6.(C_9H_{12})_1]$, COF-5 $(C_9H_4BO_2)$, and combinations thereof. The synthesis and crystallization of suitable COF materials is described by C⊥tθ, et al., "Porous, Crystalline, Covalent Organic Frameworks," *Science*, Vol. 310, pages 1166-1170 (Nov. 18, 2005).

The dried receptor 14 may then be added to a solvent to form a dispersion of the receptor 14 in the solvent. As a non-limiting example, the solvent is acetone, dimethylformamide (DMF), diethyl-formamide (DEF), or any other organic solvent. The receptor 14/solvent dispersion may include a weight ratio of receptor 14 to solvent ranging from about 1:0.01 to about 1:100. As a non-limiting example, about 200 mg of the dried receptor 14 is added to about 20 mL of acetone. In an embodiment, the receptor 14/solvent dispersion is stirred for a predetermined time at room temperature.

A predetermined amount of a solution including a source of the metal particles 12 and a solvent is added to the solvent/receptor 14 dispersion. As non-limiting examples, the solvent may be acetone, DMF, DEF, or any other organic solvent; and the source of metal particles 12 may be any metal salt of the desired hydrogen-dissociating metals that are to be doped on the receptor 14. Examples of such metal particle sources include salts of transition metals and salts of noble metals. In a non-limiting example, the source of metal particles 12 is $H_2PtCl_6$. The metal particle 12 source/solvent solution may include a weight ratio of metal particle 12 to solvent ranging from about 1:0.01 to about 1:100. As a non-limiting example, about 26 mg of $H_2PtCl_6$ is added to about 2 mL of acetone, and this entire solution is added as the predetermined amount. In an embodiment, the predetermined amount of metal particle 12 source/solvent solution added to the solvent/receptor 14 dispersion is enough such that the mixture is a slurry or a semi-liquid.

It is to be understood that as the metal particle 12 source/solvent solution is added to the solvent/receptor 14 dispersion, the mixture/slurry is subjected to agitation. The mixture/slurry is then exposed to ultrasonication. In an embodiment, ultrasonication is accomplished at a predetermined power, frequency, and temperature, and for a predetermined time. Generally, the power ranges from about 5 W to about 200 W, the frequency ranges from about 10 KHz to about 10 MHz, the temperature ranges from about 0° C. to about 100° C., and the time ranges from about 5 minutes to about 5 hours. In a non-limiting example, ultrasonication is accomplished at about 100 W, about 42 KHz, at room temperature for about 1 hour. The ultrasonication may be followed by agitation (e.g., magnetically induced agitation) at room temperature for a predetermined time.

In an embodiment, the ultrasonicated mixture/slurry is dried to remove excess solvent, moisture, etc., to form the composition 10 shown in FIG. 1. As depicted, the metal particles 12 are highly dispersed on and/or in the receptor 14. Without being bound to any theory, it is believed that the ultrasonication creates finer metal particles 12 and enables better dispersion. It is further believed that the dispersed metal particles 12 have a relatively large surface area that enables maximum contact with the receptor 14 and hydrogen molecules.

The method may also include exposing the composition 10 to one or more gas flows. This may be accomplished to suitable gas flows include a helium gas flow, a hydrogen gas flow, or combinations thereof. In an embodiment, the composition 10 is exposed to a first gas flow (e.g., He) at a first temperature, and then to a second gas flow (e.g., $H_2$) at a second temperature, where the second temperature is higher than the first temperature. The composition 10 is then slowly cooled to room temperature in the presence of a gas (suitable examples of which are previously described).

Figure 2:
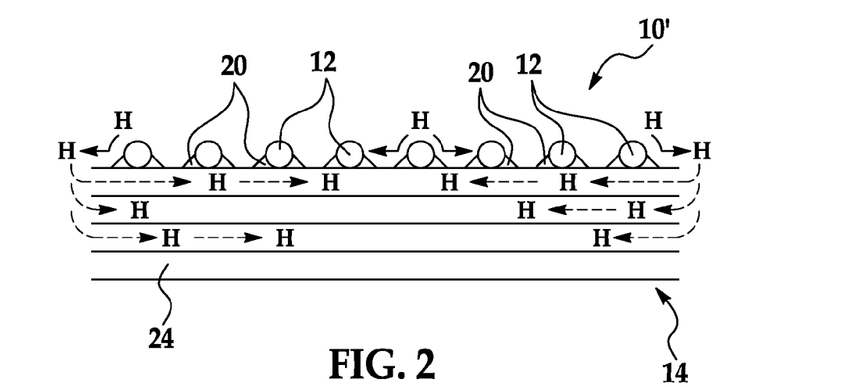
FIG. 2 is a schematic diagram depicting the spillover process in another embodiment of the composition.

Referring now to FIG. 2, an embodiment of the composition 10 of FIG. 1 is shown (as reference numeral 10') after exposure to a plasma treatment. Suitable plasma treatments include glow discharge plasma (in which a gas such as Ar (or other inert gases), $H_2$, $O_2$, $CO_2$, or the like is used), microwave plasma, plasma spraying, radio frequency plasma, and combinations thereof. The plasma treatment effectively forms a chemical bridge 20 at the interstices between the metal particles 12 and the receptor 14. Without being bound to any theory, it is believed that the chemical bridges 20 may enhance the hydrogen storage capacity by about 270% from the hydrogen storage capacity of the receptor 14 prior to any treatment, depending, at least in part, on the receptor 14 selected. In the embodiment shown in FIG. 2, it is believed that the spillover and storage capacity is enhanced by both the doping/ultrasonication process and the plasma treatment.

Figure 3:
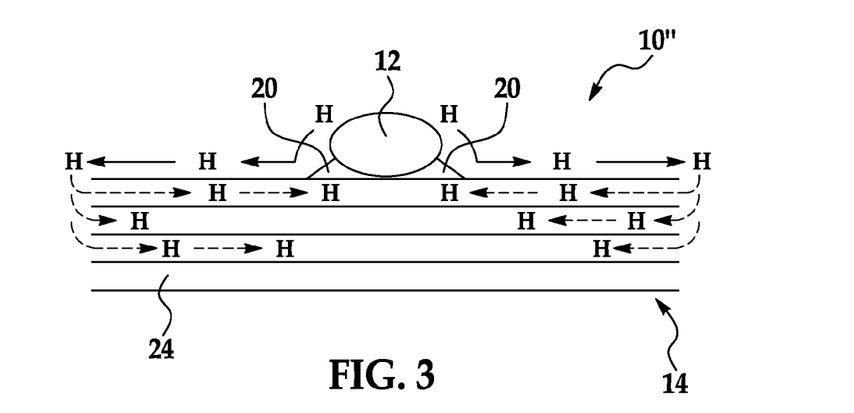
FIG. 3 is a schematic diagram depicting the spillover process in still another embodiment of the composition.

In an embodiment, the plasma treatment is accomplished at a predetermined pressure and temperature. It is to be understood that the pressure and temperature selected will depend, at least in part, on the plasma treatment used and/or the materials used to form the composition 10, 10', 10". In some embodiments, the pressure ranges from about 1 torr to about 1 atm, and the temperature ranges from about 0° C. to about 1000° C. The composition 10 may be exposed to plasma treatment for any suitable time period, and in an embodiment, the time ranges from about 5 minutes to about 60 minutes.

Referring now to FIG. 3, an embodiment of the composition 10" formed via other doping methods and plasma treatment is depicted. Other doping methods include physical mixing methods (e.g., described in U.S. patent application Ser. No. 11/442,898), chemical doping methods, or combinations thereof. The plasma treatment may be performed as previously described to form chemical bridges between the metal particle 12 and the receptor 14. As previously stated, it is believed that the formation of such bridges 20 enhanced spillover and storage capacity. It is to be understood that doping and plasma treatment may also be performed in one step by using, for example, plasma spraying.

It is to be understood that the compositions 10, 10', 10" may be substantially fully reversible through desorption and re-adsorption at about 298 K. Without being bound to any theory, it is believed that the release of hydrogen at room temperature is possible because the bond energy is low enough to desorb. In an embodiment, desorption at 298 K may take place in a vacuum (about 1 Pa) for a predetermined time (e.g., a time ranging from about 1 minute to about 10 hours). It is to be understood that the predetermined time may depend, at least in part, on the amount of hydrogen to be desorbed. In another embodiment, desorption may be accomplished by heating the composition 10, 10', 10" at a temperature ranging from about 298K to about 423 K.

Without being bound to any theory, it is believed that molecular hydrogen may also be desorbed from the receptor 14 of the composition 10, 10', 10" upon depressurization. In this embodiment, it is believed that hydrogen atoms on the interior sites of the receptor 14 desorb first. The binding energies on these interior sites are relatively low (e.g., on the order of 10-15 kcal/mol), and the adsorbed hydrogen atoms are mobile. As such, an interior-exterior exchange is possible, and the interior sites substantially continuously serve as the sites to which hydrogen atoms migrate and from which hydrogen is desorbed as molecular hydrogen.

FIGS. 1, 2 and 3 also depict the spillover process in the composition 10, 10', 10". Dissociation of the hydrogen atoms (as indicated by H) takes place on the metal particles 12 and atomic hydrogen spills over ultimately to the receptor 14.

In FIG. 1, the atoms are transported to the receptor 14 via diffusion, and may then access additional sites 24 on the receptor 14. In this embodiment, it is believed that the relatively large metal surface area enhances primary spillover and thus, storage capacity of composition 10.

In FIGS. 2 and 3, the atoms are transported to the receptor 14 via diffusion across the bridges 20, and may then access additional sites 24 on the receptor 14. In the embodiment shown in FIG. 2, it is believed that the combination of the relatively large metal surface area and the chemical bridges 20 enhance primary spillover and thus, storage capacity of composition 10'. In the embodiment shown in FIG. 3, it is believed that the chemical bridges 20 enhance primary spillover and thus, storage capacity of composition 10".

In any of the embodiments disclosed herein, the metal particles 12 may be supported by a support (not shown). Generally, the metal particles 12 are capable of dissociating hydrogen from the gas phase. In an embodiment, the metal particles may be formed of transition or noble metals (non-limitative examples of which include Pt, Pd, Ru, Rh, Ni, Co, Fe, or the like, or combinations thereof), or hydrogenation catalysts that are capable of dissociating hydrogen (a non-limitative example of which includes copper chromate). Any high surface area porous material may be used as the support (non-limitative examples of which include activated carbon, carbon nanotubes, carbon nanofibers, activated alumina, silica gel, clays, metal oxides, molecular sieves, zeolites, or the like, or combinations thereof).

It is to be understood that the supported metal particles may serve as the source of hydrogen atoms via dissociation. Generally, if the source of atomic hydrogen is a dissociating metal particle 12 on a low capacity support, hydrogen adsorption may be increased by adding a high capacity receptor 14. In this case, the transport of hydrogen atoms from the metal particles 12 to the support is referred to as primary spillover, and the transport of hydrogen atoms from the support to the receptor 14 is referred to as secondary spillover.

To further illustrate embodiment(s) of the present disclosure, various examples are given herein. It is to be understood that these examples are provided for illustrative purposes and are not to be construed as limiting the scope of the disclosed embodiment(s).

EXAMPLE 1

Platinum Nanoparticles Doped on Super Activated Carbon Using Ultrasonication

Preparation of Sample

AX-21 super-activated carbon was obtained from Anderson Development Company. AX-21 generally adsorbs a large amount of moisture from the ambient air, and as such, it was dried by degassing in vacuum at 393 K for 12 hours before doping. About 200 mg of the well-dried AX-21 carbon was dispersed in about 20 mL of acetone and stirred for about 0.5 hours in a 125 mL Erlenmeyer flask at room temperature.

A 2 mL acetone solution containing 26 mg $H_2PtCl_6$ (Aldrich, 99.9%) was slowly added dropwise to the above solution under vigorous agitation for about 10 minutes. The Erlenmeyer flask containing the slurry was subjected to ultrasonication (100 W, 42 KHz) at room temperature for about 1 hour, and then was magnetically agitated at room temperature for about 24 hours.

The sample was dried in an oven at 333K overnight to evaporate most of the acetone solvent, and then the impregnated carbon sample was transferred to a quartz boat, which was slid into a horizontal quartz tube. The sample was further dried in a He flow at 393K for about 2 hours to remove any residual acetone and any moisture adsorbed on the sample. The He flow was switched to an $H_2$ flow, and the temperature was increased to 573K at a heating rate of 1 K/min. This flow and temperature was held for about 2 hours. After slowly cooling to room temperature in $H_2$, the sample was purged with flowing He and stored under He atmosphere before further measurement.

Characterization of Sample

The BET surface areas, pore volumes, and median pore diameters of pure AX-21 and the Pt doped AX-21 sample are shown in Table 1.

TABLE 1

Surface areas, pore volumes, and pore diameters of AX-21 and Pt/AX-21

| Sample | BET SA $(m^2/g)$ | Langmuir SA $(m^2/g)$ | Pore volume $(cm^3/g)^a$ | Median pore diameter $(Å)^a$ |
|---|---|---|---|---|
| AX-21 | 2880 | 4032 | 1.27 | 20.3 |
| Pt/AX-21 | 2518 | 3678 | 1.22 | 13.8 |

$^a$From H-K analysis

The super-activated carbon (AX-21) had a BET surface area of 2880 m2/g and a total pore volume of 1.27 $cm^3/g$. As shown in the Table, the BET surface area and pore volume decreased slightly upon doping a small amount of Pt. It is believed that the decrease in surface area and pore volume may be attributed to blocking or filling of the micropores and mesopores of AX-21 by Pt particles. EDX analysis showed that the content of Pt doped on the AX-21 carbon was about 5.6 wt %, in agreement with the stoichiometry in the synthesis.

Figure 4A:
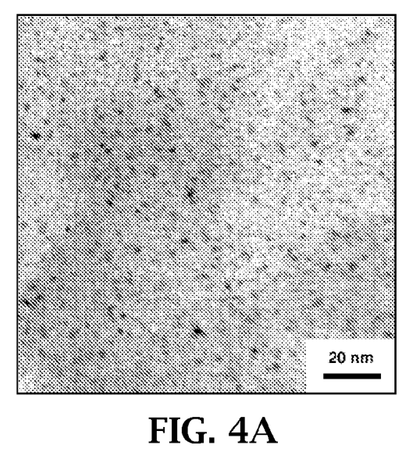
FIGS. 4A through 4D are high-resolution transmission electron microscopy (HRTEM) images of a Pt/AX-21 sample formed using ultrasonication.
Figure 4B:
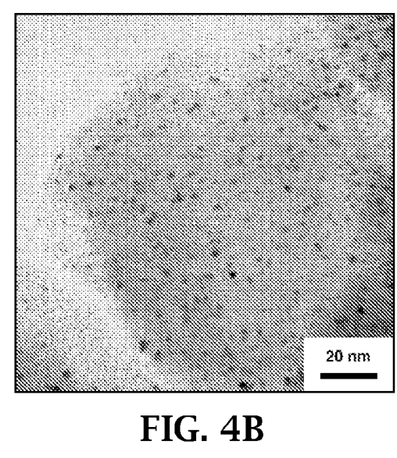
Figure 4C:
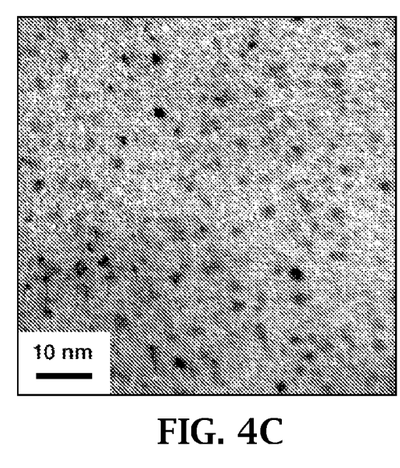
Figure 4D:
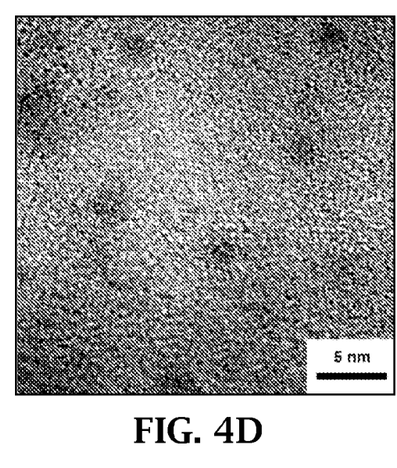

High-resolution TEM images of the Pt/AX-21 sample are shown in FIGS. 4A through 4D. As depicted, the Pt nanoparticles were highly dispersed on the surface of the super-activated carbon with rather uniform sizes around 2 nm. As shown in FIG. 4D, at a higher resolution, the black spots of Pt particles were distributed widely over the carbon surface, and the microstructures of the carbon began to emerge.

The dispersion of platinum of the Pt/AX-21 sample was determined by using static volumetric CO and $H_2$ chemisorption methods. The amounts of chemisorbed CO or $H_2$ on the samples were obtained by the isotherm extrapolation method introduced by Benson and Boudart in which the isotherm from low pressures is extrapolated to zero pressure to determine the monolayer surface coverage of the sample. The amount of chemisorbed CO (at 308 K) on pure AX-21 was zero, indicating that the adsorption of CO on AX-21 is physical adsorption. The obtained CO chemisorbed amount at zero pressure on the Pt/AX-21 sample was about 2.6 cm$^3$/g. Assuming 0.7 CO molecule per surface Pt atom, the dispersion of Pt on AX-21 was calculated to be about 58%. This indicated a high dispersion of Pt on AX-21 using the doping technique disclosed herein.

Hydrogen Isotherm Measurements

Hydrogen adsorption at 298 K and pressures greater than 0.1 MPa and up to 10 MPa was measured using a static volumetric technique with a specially designed Sievert's apparatus. The apparatus was previously tested for leaks and accuracy. Calibration was accomplished using LaNi5, AX-21, zeolites, and IRMOFs at 298 K. All isotherms matched the known values for these materials. Approximately 200-300 mg of each sample (pure AX-21 and Pt/AX-21) was used for each high-pressure isotherm measurement. Before measurements, the samples were degassed in vacuum at 623 K (350° C.) for at least 12 hours.

Figure 5:
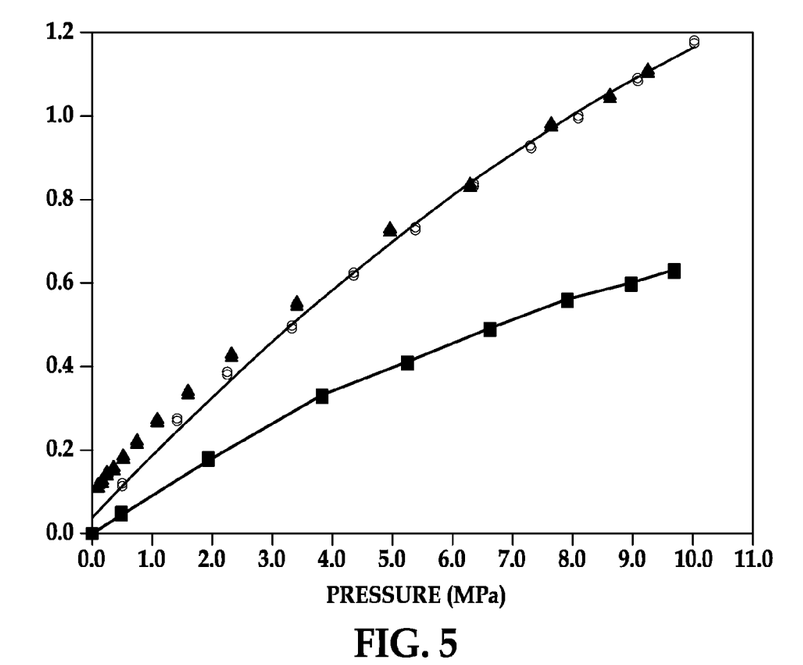
FIG. 5 is a graph depicting high-pressure hydrogen isotherms at 298 K for pure AX-21 ■, and the Pt/AX-21 sample: adsorption ○, and desorption ▲.

The high-pressure hydrogen isotherms at 298K for pure AX-21 and Pt/AX-21 are shown in FIG. 5. As depicted, AX-21 had a hydrogen storage capacity of about 0.6 wt % at 298K and 10 MPa. This value corresponded with the reported data on the $H_2$ uptakes on AX-21 under the same conditions. Furthermore, repeated $H_2$ adsorption measurements on the high-pressure $H_2$ adsorption system yielded the same value. This indicates that the apparatus and measurement procedure were highly accurate and reproducible.

By doping about 5.6 wt % Pt on AX-21, the hydrogen uptakes have been significantly enhanced at all pressures, as shown in FIG. 5. The maximum hydrogen storage capacity was about 1.2 wt % at 10 MPa. In comparison with pure AX-21, the hydrogen adsorption amount has been enhanced by a factor of 2.

It is believed that this significant enhancement cannot be attributed to the differences in the surface area and pore volume because both the surface area and pore volume of the Pt/AX-21 sample were lower than that of pure AX-21 (see Table 1). Furthermore, it is believed that hydrogen adsorption on Pt metal is also not the reason for the enhancement. Even assuming 100% dispersion of Pt on AX-21 and one H atom per Pt, the hydrogen adsorption amount on 6 wt % Pt in the doped sample amounts to 0.03 wt %. Furthermore, if the individual contributions of 6 wt % Pt metal and the AX-21 support (94% in the doped sample) were considered additive, the expected hydrogen uptake of the Pt/AX-21 sample would be slightly lower than 0.6 wt %, i.e., the storage capacity of pure AX-21.

As such, it is believed that the enhancement was clear evidence of spillover of atomic hydrogen from the Pt nanoparticles to the AX-21 receptor. Without being bound to any theory, it is believed that the high dispersion of the Pt nanoparticles on the AX-21 carbon resulted from using ultrasound, which in turn led to the high storage capacity. Highly dispersed Pt has a large metal surface area that enables the maximum contact with the carbon structures, and also with hydrogen molecules.

Reversibility of the Pt/AX-21 sample was evaluated by measuring the desorption branch down to 1 atm. FIG. 5 depicts that the desorption branch nearly followed the adsorption branch, although there appeared to be a slight hysteresis. The sample was then evacuated to a pressure of 1 Pa (7.5× 10$^{-3}$ Torr) for about 12 hours at 298 K, and total desorption occurred. A second adsorption isotherm was in complete agreement with the first adsorption isotherm. These results indicate that hydrogen adsorption in the Pt/AX-21 sample was fully reversible.

EXAMPLE 2

Platinum Nanoparticles Doped on Super Activated Carbon Using Ultrasonication Followed by Plasma Treatment Preparation of Samples Two Pt/AX-21 samples having 6 wt % doped platinum were formed using the method described in Example 1. After doping, one of the samples was treated to a glow discharge plasma treatment using argon at 100-200 Pa pressure. The glow discharge was generated by applying 900 V to the electrodes. The temperature of the plasma was near the ambient temperature. The time for plasma treatment ranged from 10 minutes to 50 minutes.

Equilibrium Adsorption Isotherms

Figure 6:
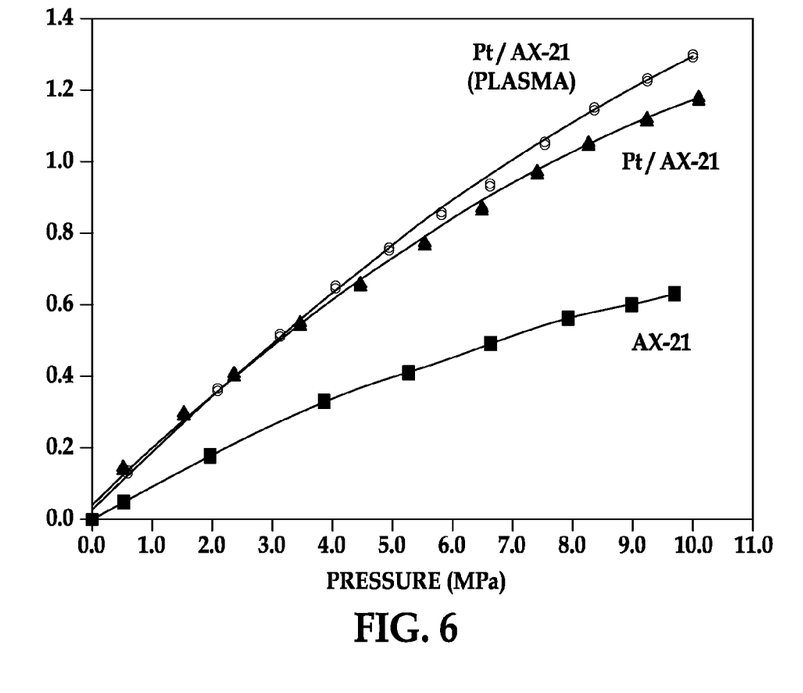
FIG. 6 is a graph depicting equilibrium adsorption isotherms for hydrogen at 298 K on super-activated carbon AX-21 (BET surface area ~2600 $m^2/g$) ■, Pt-doped AX-21 carbon with ultrasound ▲, and Pt-doped AX-21 with ultrasound and plasma treatment ○.

The procedure for measuring the equilibrium adsorption isotherms was the same as that described in Example 1 for the hydrogen isotherm measurements. FIG. 6 depicts the equilibrium adsorption isotherms for hydrogen at 298 K on pure super-activated carbon AX-21 (BET surface area about 2600 m2/g) ■, the Pt-doped AX-21 carbon formed with ultrasound ▲, and the Pt-doped AX-21 sample formed with ultrasound and plasma treatment ○.

As shown in FIG. 6, the curve denoted by Pt/AX-21 was the sample that was doped with 6 wt % Pt using the ultrasound technique. This sample had an increased hydrogen equilibrium adsorption isotherm when compare to the pure AX-21 sample. Upon further plasma treatment, an additional enhancement in hydrogen storage was obtained.

EXAMPLE 3

Platinum Nanoparticles Doped on Activated Carbon Followed by Plasma Treatment

Preparation of Samples

Two Pt/C samples having 3 wt % doped platinum were formed using conventional doping techniques, such as incipient wetness impregnation. Norit activated carbon (commercially available from Norit Americas Inc. in Marshall, Tex.) was used as the receptor in this example. After doping, one of the samples was treated to a glow discharge plasma treatment using argon at 100-200 Pa pressure. The glow discharge was generated by applying 900 V to the electrodes. The temperature of the plasma was near the ambient temperature. The time for plasma treatment ranged from 10 minutes to 50 minutes.

Equilibrium Adsorption Isotherms

Figure 7:
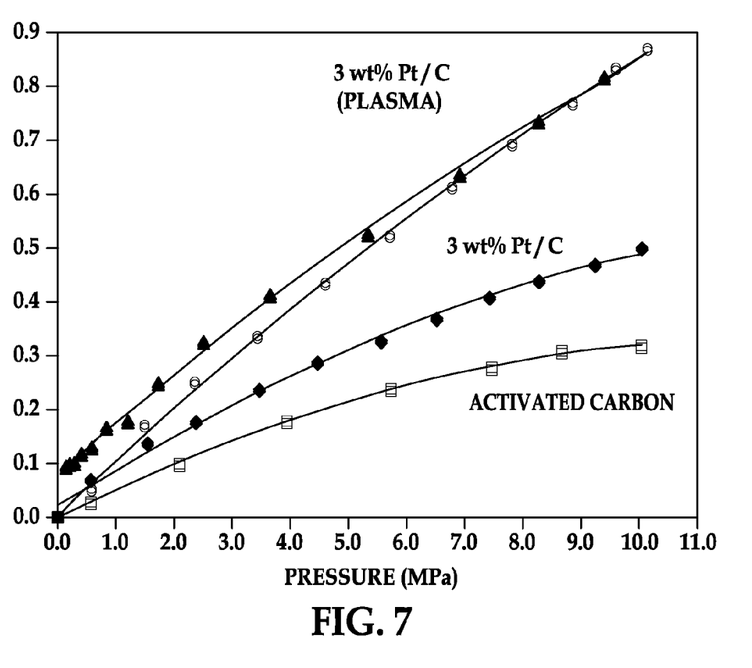
FIG. 7 is a graph depicting equilibrium adsorption isotherms for hydrogen at 298 K on activated carbon (BET surface area ~1000 $m^2/g$) □, Pt-doped carbon ♦, and Pt-doped carbon with further plasma treatment ○, ▲.

The procedure for measuring the equilibrium adsorption isotherms was the same as that described in Example 1 for the hydrogen isotherm measurements. The effects of plasma treatment on the hydrogen storage of 3 wt % Pt doped activated carbon are shown in FIG. 7. In FIG. 7, the equilibrium adsorption isotherm of hydrogen at 298K is shown. After doping the carbon with 3 wt % Pt, the hydrogen storage capacity was increased by about 50%, due to spillover. As previously described, one sample of Pt doped carbon was further treated with plasma, and this resulted in an increase of the hydrogen storage capacity by approximately 270% from the value of the pure carbon. This large enhancement by plasma treatment was attributed to chemical bridges that were built between the Pt particles and the carbon surface, which is believed to have enhanced the spillover. The triangle symbol in FIG. 7 indicates the data on desorption of the plasma treated Pt doped carbon at 298K. The last data point, not shown here, was taken by evacuation, and the isotherm returned to zero upon evacuation. Thus, the adsorbed hydrogen via spillover could be desorbed completely at 298K.

While several embodiments have been described in detail, it will be apparent to those skilled in the art that the disclosed embodiments may be modified. Therefore, the foregoing description is to be considered non-limiting.

What is claimed is:

1. A method for enhancing hydrogen storage, comprising:
   doping a hydrogen receptor with metal particles, the hydrogen receptor being selected from carbon nanotubes, carbon nanofibers, molecular sieves, silica gel, zeolites, metal-organic framework materials, and combinations thereof, wherein doping is accomplished by:
      forming a dispersion including the hydrogen receptor; and
      adding a solution including a source of the metal particles to the dispersion including the hydrogen receptor, thereby forming a mixture;
   exposing the hydrogen receptor to ultrasonication as doping occurs;
   drying the mixture to form a composition;
   subjecting the composition to a first gas flow at a first temperature;
   subjecting the composition to a second gas flow at a second temperature, the second temperature being higher than the first temperature; and
   cooling the composition.

2. The method as defined in claim 1, further comprising drying the hydrogen receptor prior to doping.

3. The method as defined in claim 1 wherein subsequent to doping and ultrasonication and prior to drying, the method further comprises magnetically agitating the mixture.

4. The method as defined in claim 1 wherein the first gas flow is a helium gas flow, and the second gas flow is a hydrogen gas flow.

5. The method as defined in claim 1 wherein the source of the metal particles is a salt of a transition metal.

6. The method as defined in claim 1 wherein the metal particles are selected from platinum, palladium, ruthenium, rhodium, nickel, copper, iron, and combinations thereof.

7. A method for enhancing hydrogen storage, comprising:
   doping a hydrogen receptor with metal particles, thereby forming a doped hydrogen receptor, the hydrogen receptor being selected from carbon nanotubes, carbon nanofibers, molecular sieves, silica gel, zeolites, metal-organic framework materials, and combinations thereof;
   exposing the hydrogen receptor to ultrasonication as doping occurs; and
   exposing the doped hydrogen receptor to a plasma treatment.

8. The method as defined in claim 7 wherein the plasma treatment is selected from glow discharge plasma, microwave plasma, plasma spraying, and combinations thereof.

9. The method as defined in claim 8 wherein a gas used in the glow discharge plasma is selected from inert gases, hydrogen gas, oxygen gas, carbon dioxide, and combinations thereof.

10. The method as defined in claim 7, further comprising forming chemical bridges between respective metal particles and a surface of the hydrogen receptor.

11. The method as defined in claim 7 wherein the plasma treatment is accomplished for a predetermined time ranging from about 5 minutes to about 60 minutes at a predetermined temperature up to 1000° C.

12. The method as defined in claim 7 wherein doping is accomplished by:
   forming a dispersion including the hydrogen receptor; and
   adding a solution including a source of the metal particles to the dispersion including the hydrogen receptor, thereby forming a mixture.

13. The method as defined in claim 12 wherein the source of the metal particles is a salt of a transition metal.

14. The method as defined in claim 7 wherein the metal particles are selected from platinum, palladium, ruthenium, rhodium, nickel, copper, iron, and combinations thereof.

* * * * *